(12) United States Patent
Okano (10) Patent No.: US 8,783,692 B2
(45) Date of Patent: Jul. 22, 2014

(54) MULTILAYER STATIC GASKET WITH BEAD COMPRESSION LIMITER

(71) Applicant: Federal-Mogul Corporation, Southfield, MI (US)

(72) Inventor: Takashi Okano, Pinckney, MI (US)

(73) Assignee: Federal-Mogul Corporation, Southfield, MI (US)

(*) Notice: Subject to any disclaimer, the term of this patent is extended or adjusted under 35 U.S.C. 154(b) by 0 days.

(21) Appl. No.: 14/108,709

(22) Filed: Dec. 17, 2013

(65) Prior Publication Data

US 2014/0103610 A1 Apr. 17, 2014

Related U.S. Application Data

(63) Continuation of application No. 12/370,253, filed on Feb. 12, 2009, now Pat. No. 8,632,077.

(60) Provisional application No. 61/028,317, filed on Feb. 13, 2008, provisional application No. 61/109,682, filed on Oct. 30, 2008.

(51) Int. Cl.
*F02F 11/00* (2006.01)

(52) U.S. Cl.
USPC ............................ 277/593; 277/595; 277/592

(58) Field of Classification Search
USPC .................................. 277/591, 592, 593, 595
See application file for complete search history.

(56) References Cited

U.S. PATENT DOCUMENTS

| | | |
|---|---|---|
| 5,161,809 A | 11/1992 | Matsushita et al. |
| 5,286,039 A | 2/1994 | Kawaguchi et al. |
| 5,378,001 A | 1/1995 | Miyaoh |
| 5,522,604 A | 6/1996 | Weiss et al. |
| 5,618,049 A | 4/1997 | Ueta |
| 5,628,113 A | 5/1997 | Tanaka et al. |
| 5,713,580 A | 2/1998 | Ueta |
| 5,863,046 A | 1/1999 | Diez et al. |
| 6,053,503 A | 4/2000 | Buck et al. |
| 6,152,456 A | 11/2000 | Ziegler |
| 6,283,480 B1 | 9/2001 | Miura et al. |
| 6,315,303 B1 | 11/2001 | Erb et al. |
| 6,431,554 B1 | 8/2002 | Miyamoto et al. |
| 6,450,504 B2 | 9/2002 | Bleidt et al. |
| 6,565,097 B2 | 5/2003 | Jinno |

(Continued)

FOREIGN PATENT DOCUMENTS

| | | |
|---|---|---|
| CN | 1443289 A | 9/2003 |
| DE | 19641491 A1 | 4/1998 |

(Continued)

*Primary Examiner* — Gilbert Lee
(74) *Attorney, Agent, or Firm* — Robert L. Stearns; Dickinson Wright, PLLC (57) ABSTRACT

A multilayer cylinder head gasket has a pair of functional layers and a distance layer with aligned openings. Each functional layer has a full bead located radially outwardly from and extending about its opening. Each functional layer also has a half bead spaced from the full bead. The distance layer includes a first portion extending radially from the opening and having a first thickness. A second portion of the distance layer extends radially from the first portion and has a second thickness that is less than the first thickness. A third portion of the distance layer extends radially from the second portion and has a third thickness less than the second thickness. The distance layer comprises a plurality of pieces, and at least one of the pieces limits compression of at least one of the full beads when the functional layers are compressed together.

14 Claims, 5 Drawing Sheets

(56) References Cited

U.S. PATENT DOCUMENTS

| | | |
|---|---|---|
| 6,565,098 B2 | 5/2003 | Bleyh |
| 6,619,666 B1 | 9/2003 | Tanaka et al. |
| 6,688,606 B2 | 2/2004 | Hohe et al. |
| 6,708,982 B2 | 3/2004 | Zerfass et al. |
| 6,712,364 B2 | 3/2004 | Unseld et al. |
| 6,769,696 B2 | 8/2004 | Diez et al. |
| 6,918,597 B2 | 7/2005 | Egloff |
| 6,951,338 B2 | 10/2005 | Kestly |
| 7,000,924 B2 | 2/2006 | Höhe et al. |
| 7,086,651 B2 | 8/2006 | Zerfass et al. |
| 7,204,491 B2 | 4/2007 | Hatamura et al. |
| 7,287,757 B2 | 10/2007 | Chen et al. |
| 7,374,177 B2 | 5/2008 | Tripathy et al. |
| 7,909,337 B2 | 3/2011 | Ueta et al. |
| 2002/0011709 A1 | 1/2002 | Jinno et al. |
| 2002/0153666 A1 | 10/2002 | Unseld |
| 2002/0180161 A1 | 12/2002 | Werz et al. |
| 2003/0042689 A1 | 3/2003 | Diez et al. |
| 2004/0160017 A1 | 8/2004 | Diez et al. |
| 2005/0206091 A1 | 9/2005 | Detmann et al. |
| 2006/0061045 A1 | 3/2006 | Burg |
| 2006/0066059 A1 | 3/2006 | Fritz |
| 2006/0097459 A1 | 5/2006 | Hohe et al. |
| 2006/0175763 A1 | 8/2006 | Duckek et al. |
| 2007/0013145 A1 | 1/2007 | Detmann et al. |
| 2007/0090607 A1 | 4/2007 | Ueta et al. |
| 2007/0090608 A1 | 4/2007 | Ueta |
| 2007/0158918 A1 | 7/2007 | Belter |
| 2007/0262536 A1 | 11/2007 | Werz et al. |
| 2008/0012235 A1 | 1/2008 | Fritz |
| 2010/0109255 A1 | 5/2010 | Waldvogel et al. |

FOREIGN PATENT DOCUMENTS

| | | |
|---|---|---|
| DE | 102004012905 A1 | 10/2005 |
| EP | 0459060 A1 | 12/1991 |
| EP | 0485693 A1 | 5/1992 |
| EP | 0494489 A1 | 7/1992 |
| EP | 0627581 A1 | 12/1994 |
| EP | 0797029 A1 | 9/1997 |
| EP | 1113199 A | 7/2001 |
| EP | 1298364 A2 | 4/2003 |
| EP | 1521019 A1 | 4/2005 |
| EP | 1777443 A1 | 4/2007 |
| JP | 06026575 A | 1/1994 |
| JP | 06229477 A | 8/1994 |
| JP | 11241769 A | 9/1999 |
| JP | 11294588 A | 10/1999 |
| JP | 2000227047 A | 8/2000 |
| JP | 2001295939 A | 10/2001 |
| JP | 2002031238 A | 1/2002 |
| JP | 2004278711 A | 10/2004 |
| JP | 2005180579 A | 7/2005 |
| JP | 2005264941 A | 9/2005 |
| JP | 2007247631 A | 9/2007 |

MULTILAYER STATIC GASKET WITH BEAD COMPRESSION LIMITER

CROSS-REFERENCE TO RELATED APPLICATIONS

This continuation application claims the benefit of U.S. patent application Ser. No. 12/370,253, filed Feb. 12, 2009, which claims the benefit of U.S. Provisional Application Ser. No. 61/028,317, filed Feb. 13, 2008, and also U.S. Provisional Application Ser. No. 61/109,682, filed Oct. 30, 2008, each of which are incorporated herein by reference in their entirety.

BACKGROUND OF THE INVENTION

1. Technical Field

This invention relates generally to static gaskets of the type used to establish a gas/fluid-tight seal between two members to be clamped together, and more particularly to multilayer static gaskets, such as a cylinder head gasket.

2. Related Art

In establishing a gas/fluid-tight seal between two members to be clamped together, such as a cylinder head and engine block, it is common to use a static cylinder head gasket having multiple layers. Generally, at least one of the layers of the multilayer gasket, sometimes referred to as a functional layer, has a seal bead to facilitate establishing a fluid tight seal. Another of the layers, sometimes referred to as a distance layer, is configured to abut the functional layer in an effort to establish the fluid tight seal by compressing the seal bead of the functional layer. Unfortunately, while fastening the cylinder head to the engine block, damage can occur to the seal bead by over-compressing the seal bead. If the seal bead is over-compressed and substantially flattened, in addition to losing its ability to exert a high compression sealing pressure, fatigue cracks can form in the area of the seal bead, such as during initial clamping or while in use. If formed, fatigue cracks ultimately reduce the ability of the static gasket to establish an air and/or fluid-tight seal, thereby diminishing the life and performance of the engine.

SUMMARY OF THE INVENTION

A multilayer cylinder head gasket for providing a gas and fluid-tight seal between a cylinder head and an engine block is provided. The cylinder head gasket comprises a first functional layer, a second functional layer, and a distance layer. The first functional layer forms a first opening and includes a first full compression bead radially outwardly from and circumferentially surrounding the first opening. The first full compression bead extends out of a plane of the first functional layer. The second functional layer forms a second opening aligned with the first opening and including a second full compression bead radially outwardly from and circumferentially surrounding the second opening. The second full compression bead extends out of a plane of the second functional layer. The distance layer is provided by a plurality of pieces of material disposed between the first functional layer and the second functional layer. The distance layer presents a first portion extending radially from an opening aligned with the openings of the functional layers; a second portion extending radially outwardly from the first portion and aligned with the full compression beads of the functional layers; and a third portion extending radially outwardly from the second portion. The first portion of the distance layer presents a first thickness, the second portion of the distance layer presents a second thickness, and the third portion of the distance layer presents a third thickness, wherein the first thickness is greater than the second thickness and the second thickness is greater than the third thickness.

BRIEF DESCRIPTION OF THE DRAWINGS

These and other aspects, features and advantages of a multilayer gasket constructed in accordance with the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
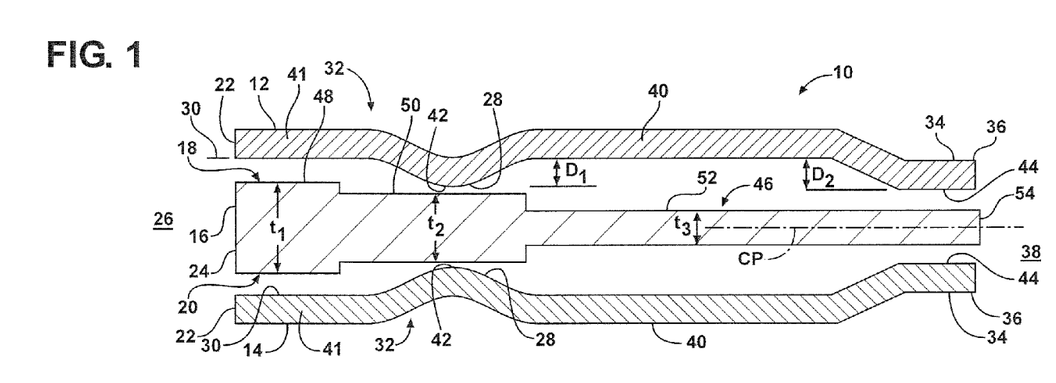
FIG. 1 is a radial cross-sectional side view of a multilayer cylinder head gasket constructed in accordance with one aspect of the invention.

Referring in more detail to the drawings, FIG. 1 illustrates a radial cross-sectional view taken through a portion of a multilayer gasket, referred to hereafter as gasket 10, constructed in accordance with one aspect of the invention. The gasket 10 has at least one functional layer, represented here as a pair of functional layers 12, 14, and a distance layer 16. The functional layers 12, 14 are arranged to abut opposite sides 18, 20 of the distance layer 16, such that the distance layer 16 is sandwiched between the functional layers 12, 14, wherein the individual layers can be fixed to one another, such as by a weld joint or rivet, preferably at an outermost periphery (not shown) of the gasket 10. The functional layers 12, 14 each have an opening 22 sized to register with an opening 24 in the distance layer 16, wherein the respective openings are each arranged with one another to register with a cylinder bore 26. The functional layers 12, 14 each have full compression seal beads 28 extending outwardly from a plane 30 of the layers 12, 14 to facilitate establishing a gas-tight seal about the cylinder bore 26. A compression limiter, shown generally at 32, is formed in at least one of the functional layers 12, 14 or the distance layer 16. The compression limiter 32 prevents the full beads 28 from being completely flattened within the plane 30 upon fastening the cylinder head (not shown) to the engine block (not shown). As such, the full beads 28 are assured of maintaining a generally constant, high sealing pressure against the distance layer 16 relative to the remaining portions of the functional layers 12, 14, thereby providing and maintaining a gas-tight seal about the circumference of the cylinder bore 26. In addition to maintaining the desired gas-tight seal about the cylinder bore 26, the beads 28, by not being over-compressed and completely flattened, remain free from the formation of premature fatigue cracks both during assembly and while in use.

The functional layers 12, 14 are constructed from a resilient metal, such as spring steel, for example, and can be provided having a thickness of about 0.1 to 0.3 mm, for example. The functional layers 12, 14, as shown in FIG. 1, are constructed having mirrored profiles facing one another, with each having the aforementioned full beads 28 adjacent the cylinder bore 26, with half beads 34 extending to an outer periphery portion 36, such as may provide a fluid-tight seal adjacent a fluid passage, such as an oil or coolant passage 38, for example. The functional layers 12, 14 have generally planar main body portions 40 extending along the plane 30, with the full beads 28 extending axially outwardly from the plane 30 a predetermined distance D1. The beads 28 are formed radially outwardly from an inner periphery portion 41 that lies along the plane 30 and terminates at the respective cylinder bore 26 upon assembly. The half beads 34 extend axially outwardly from the plane 30 a predetermined distance D2. The full beads 28 each have circumferentially extending peaks 42 facing one another for gas-tight sealing abutment with the distance layer 16, while the half beads 34 each have plateaus or flat surfaces 44 facing one another and extending generally parallel to the plane 30 for fluid-tight sealing abutment with the distance layer 16. As such, the peaks 42 and flat surfaces 44 of each functional layer 14 extend outwardly from the plane 30 in the same direction. Upon being compressed between the cylinder head and engine block, neither the full beads 28 nor the half beads 34 are fully compressed to a flattened state. Accordingly, both the full beads 28 and half beads 34 extend outwardly from the plane 30 and thus, remain elastically biased to retain their ability to established high sealing pressures to form gas and fluid-tight seals, respectively.

The distance layer 16 can be constructed from a relatively rigid metal material, such as cold rolled steel or stainless steel, for example. The distance layer 16 can be constructed having a symmetrical body 46 as viewed in radial cross-section such that the opposite sides 18, 20 are mirrored across a central plane CP. Each side 18, 20 extends along a first portion 48 having a first thickness (t1), wherein the thickness t1 is represented here as being the thickest portion of the distance layer 16. The first portion 48 extends radially outwardly to a second portion 50 having a second thickness (t2) that is less than the thickness t1. The second portion extends radially outwardly a predetermined distance to a third portion 52 having a third thickness (t3) that is less than t2. The third portion 52 extends to an opening 54 that facilitates sealing a fluid passage, such as the oil port or a coolant chamber 38, for example. It should be recognized that the respective thicknesses t1, t2, t3 of the first, second and third portions 48, 50, 52 can be varied circumferentially, such as by being stepped or having a smooth gradient, and further, that they can be varied in relation to respective thicknesses of other portions of the gasket 10 wherein more than one opening 22, 24 is formed in the functional and distance layers 12, 14, 16 to provide gas-tight seals about multiple cylinder bores 26. Given the distance layer is symmetrical as viewed in radial cross-section, it should be recognized that the relative thicknesses t1, t2 and t3 are centered relative to one another.

Upon assembly, the outer functional layers 12, 14 overlie the sandwiched intermediate distance layer 16. The inner periphery portions 41 overlie the first portion 48 of the distance layer 16; the beads 28 overlie the second portion 50 of the distance layer 16, and the half beads 34 overlie the third portion 52 of the distance layer 16. Upon fastening the cylinder head to the engine block, the peaks 42 of the beads 28 are compressed into sealing abutment against the second portion 50 to establish a high compression sealing pressure along the peaks 42 of the beads 28 to prevent combustion gas from leaking out from the respective cylinder bore 26. The beads 28 are assured of being at least partially compressed and not fully flattened, as the height D1 of the beads 28 is greater than the recessed depth [(t1−t2)/2] of the second portion 50, wherein the recessed depth can be about 10 to 20 µm, by way of example and without limitation. In addition, the plateaus 44 of the half beads 34 are compressed against the third portion 52 to establish a high compression sealing pressure to prevent fluid from leaking out from oil ports or coolant chambers 38, for example. The half beads 34 are assured of being partially compressed and not fully flattened, as the height D2 of the half beads 34 is greater than the recessed depth [(t1−t3)/2] of the third portion 52, wherein the recessed depth of the third portion can be about 30-75 µm, by way of example and without limitation. Further, yet, with the third portion 52 being further recessed from the second portion 50, such that the thickness t3 is less the thickness t2, the beads 28 are assured of remaining less than fully compressed, regardless of any distortion of the cylinder head upon being clamped to the engine block or while in use.

Figure 1A:
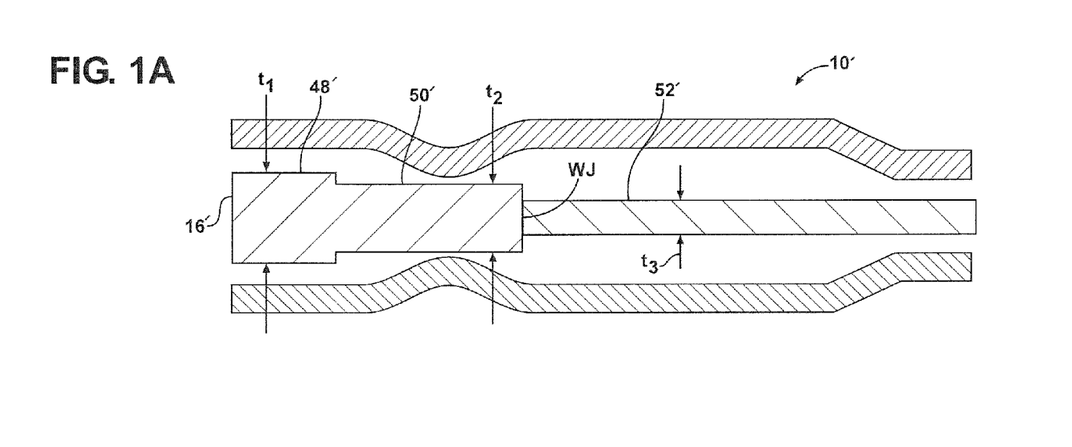
FIG. 1A is a radial cross-sectional side view of a multilayer cylinder head gasket constructed in accordance with another aspect of the invention.

FIG. 1A illustrates a multilayer gasket 10' constructed according to another aspect of the invention. The assembled structure of the gasket 10' is substantially the same as that of the previously discussed gasket 10, however, a distance layer 16' is constructed as a two-piece member from different pieces of material. The distance layer 16' has first, second and third portions 48', 50', 52' as discussed above, however, rather than being constructed of a single piece of the same material, the first and second portions 48', 50' are constructed as a single piece of the same material, such as from a material having a high yield strength, e.g. SS301/SS430 stainless steel, with their relative different thicknesses t1 and t2 being as described above. Meanwhile, the third portion 52' is constructed of a separate piece of material from the first and second portions 48, 50, and can also be formed of a different type of material, such as from a lower grade steel, e.g. SS430 stainless steel, with its reduced thickness t3 being as described above. As such, the third portion 52' can be formed from a sheet of material without having to reduce its thickness in a secondary operation, thereby improving manufacturing efficiencies. The material of the first and second portions 48', 50' can be fixed to the material of the third portion 52', such as via a weld joint (WJ). Accordingly, other than the distance layer 16' being constructed of two separate pieces of material, the multilayer gasket 10' is the same as described above for the multilayer gasket 10.

Figure 2:
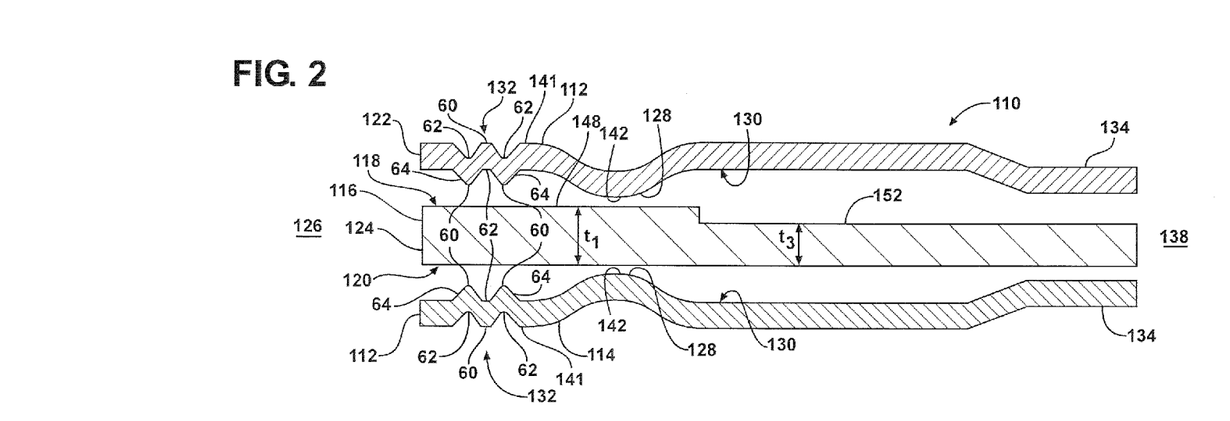
FIG. 2 is a radial cross-sectional side view of a multilayer cylinder head gasket constructed in accordance with yet another aspect of the invention.

FIG. 2 illustrates another multilayer gasket 110 constructed according to another aspect of the invention, wherein the same reference numerals used above offset by 100 are used to illustrate like features. The gasket 110 has a pair of functional layers 112, 114 arranged to abut opposite sides 118, 120 of a distance layer 116. The functional layers 112, 114 each have an opening 122 sized to register with an opening 124 in the distance layer 116, wherein the respective openings 122, 124 are each arranged concentrically with one another to register with a cylinder bore 126. The functional layers 112, 114 each have full compression seal beads 128 extending outwardly from a plane 130 of the layers 112, 114 to facilitate establishing a gas-tight seal about the cylinder bore 126. A compression limiter, shown generally at 132, is formed in the functional layers 112, 114 adjacent the full beads 128 to prevent the full beads 128 from being completely flattened within the plane 130.

In contrast to the first embodiment, the distance layer 116 is not symmetrical as viewed in radial cross-section, but rather is asymmetrical, wherein the side 118 has stepped surfaces and the opposite side 120 is planar. In addition, the distance layer 116 has a first portion 148 with a first thickness t1 and a portion corresponding to a third portion 152 having a thickness t3, but it does not have an intermediate portion corresponding to the second portion 50 discussed above. Accordingly, the distance layer 116 has a single reduction in thickness from the first thickness t1 to the third thickness t3, wherein the reduction is formed in one side 118.

The functional layers 112, 114 are formed similarly to the functional layers 12, 14 above, including having full beads 128 and half beads 134, however, the compression limiter 132 is also integrated in the functional layers 112, 114, rather than in the distance layer 116. The compression limiter 132 is represented here, by way of example and without limitation, as being formed in the material and in the inner periphery portion 141 of the functional layers 112, 114, such as via an embossing process. The compression limiter 132 is shown here, for example, as being formed between the full bead 128 and the opening 122. The compression limiter 132 is provided by an undulating or sinuous form in radial cross-section having peaks 60 and valleys 62 facing away from one another on opposite sides of the functional layers 112, 114. The sinuous form has legs 64 extending between the peaks 60 and valleys 62, wherein the legs 64 extend at an angle of inclination from the plane 130 of the respective functional layer 112, 114. The angle of inclination of the legs 64 is such to provide sufficient rigidity and strength to prevent their being fully compressed under load between the cylinder and engine blocks. The sinuous form of the compression limiter 132 extends circumferentially about the opening 122 in the functional layer 112, 114 adjacent the full bead 128 and is arranged for engagement with the first portion 148 of the distance layer 116.

Upon assembly, the outer functional layers 112, 114 overlie the sandwiched intermediate distance layer 116. The inner periphery portions 141 overlie the first portion 148 of the distance layer 116. As such, the beads 128 and the compression limiters 132 overlie the first portion 148 of the distance layer 116, while the half beads 134 overlie the third portion 152 of the distance layer 116. Upon fastening the cylinder head to the engine block, the peaks 142 of the beads 128 are partially compressed against the first portion 148 to establish a high compression sealing pressure to prevent combustion gas from leaking out from the cylinder bore 126. The beads 128 are assured of only being partially compressed and not fully flattened as a result of the adjacent compression limiters 132. Accordingly, as noted above, the full beads 128 remain free from the formation of premature fatigue cracks during assembly and in use. In addition, the plateaus 144 of the half beads 134 are compressed against the third portion 152 to establish a high compression sealing pressure to prevent fluid from leaking out from oil ports or coolant chambers 138, for example.

Figure 3:
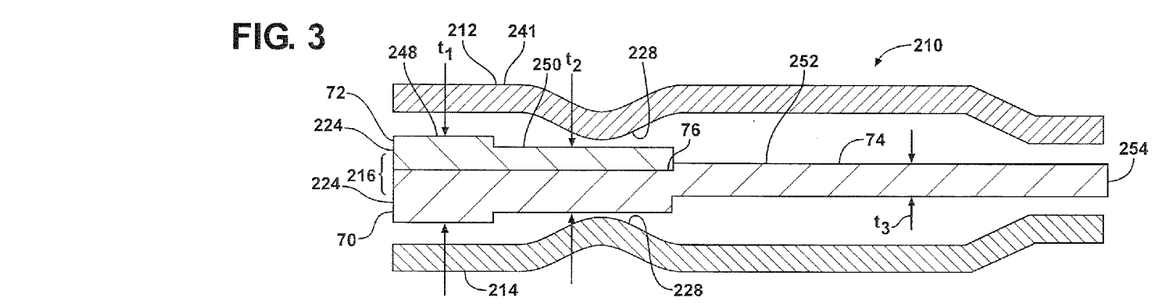
FIG. 3 is a radial cross-sectional side view of a multilayer cylinder head gasket constructed in accordance with yet another aspect of the invention.

FIG. 3 illustrates a multilayer gasket 210 constructed in accordance with another aspect of the invention, wherein the same reference numerals used above offset by 200 are used to illustrate like features. The gasket 210 has the same general geometric configuration as the gasket 10, including having the same functional layers 212, 214 as the functional layers 12, 14, and a distance layer 216 with first, second and third portions 248, 250, 252 having respective thicknesses t1, t2, t3. However, the distance layer 216, rather than being constructed as a single piece of material as the distance layer 16, is constructed of separate first and second pieces, also referred to as portions, of material 70, 72. The first and second portions 70, 72, in construction, can be attached to one another, such as via a welding or crimping operation, for example, with each have a generally planar shape at the time of attachment. Then, the first portion 70 can be coined or stamped, and the second portion can be machined, such as in an electrochemical machining process, or otherwise. As such, by being constructed of separate pieces of material and being subsequently joined to one another, the gasket 210 can be constructed from individual pieces of material having a reduced thickness, thereby eliminating potential waste of material.

The first portion 70 of the distance layer 216 provides a main body 74, extending between the combustion chamber opening 224 in the distance layer 216 and a fluid opening 254. An annular recessed section 76 in the first portion 70 extends from the opening 224 radially outwardly, wherein the recessed section 76 is sized to receive the second portion 72. The second portion 72, upon being received in the recessed section 76, extends axially outwardly from a surface 78 of the first portion 70 to provide a surface corresponding to the first and second portions 248, 250 for abutment with an inner periphery portion 241 and full bead 228 of the functional layer 212.

Figure 4:
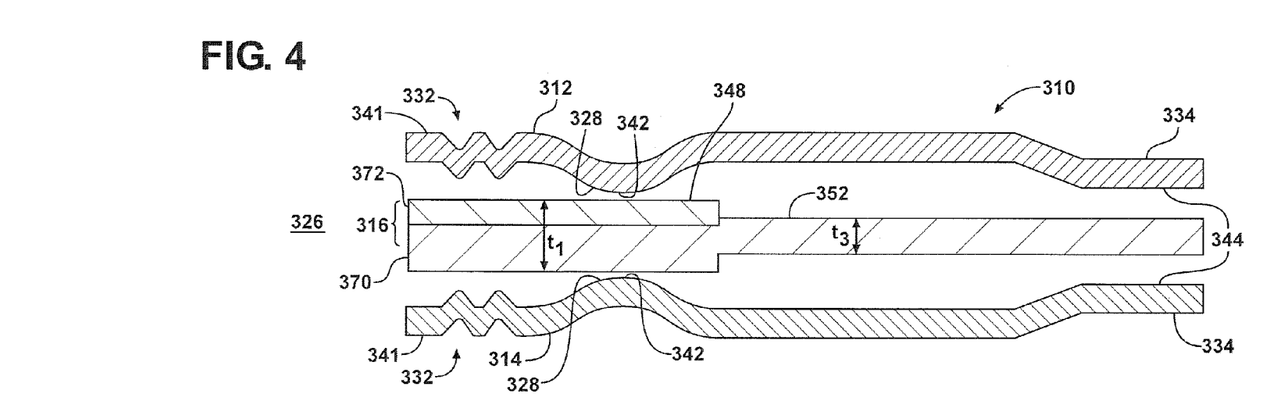
FIG. 4 is a radial cross-sectional side view of a multilayer cylinder head gasket constructed in accordance with yet another aspect of the invention.

FIG. 4 illustrates a multilayer gasket 310 constructed in accordance with another aspect of the invention, wherein the same reference numerals used above offset by 300 are used to illustrate like features. The gasket 310, as with the gasket 210, is constructed of separate first and second portions of material 370, 372. The gasket 310 has the same functional layers 312, 314 as the functional layers 112, 114, with a sinuous compression limiter 332 integrated in an inner periphery portion 341 of the functional layers 312, 314. Further, the gasket has a distance layer 316 that is symmetrical as viewed in radial cross-section with first and third portions 348, 352 having respective thicknesses t1, t3.

The outer functional layers 312, 314 overlie the sandwiched intermediate distance layer 316, with the inner periphery portions 341 overlying the first portion 348 of the distance layer 16. As such, the beads 328 and the compression limiters 332 overlie the first portion 348 of the distance layer 316, while the half beads 334 overlie the third portion 352 of the distance layer 316. Upon fastening the cylinder head to the engine block, the peaks 342 of the beads 328 are compressed against the first portion 348 to establish a high compression sealing pressure to prevent combustion gas from leaking out from the cylinder bore 326. The beads 328 are assured of only being partially compressed as a result of the adjacent compression limiters 332. Accordingly, the full beads 328 remain free from the formation of premature fatigue cracks during assembly and in use. In addition, the plateaus 344 of the half beads 334 are compressed against the third portion 352 to establish a high compression sealing pressure to prevent fluid from leaking out from oil ports or coolant chambers, for example, wherein the half beads are assured of not being fully flattened or compressed, as discussed above with regard to the previous embodiments.

Figure 5:
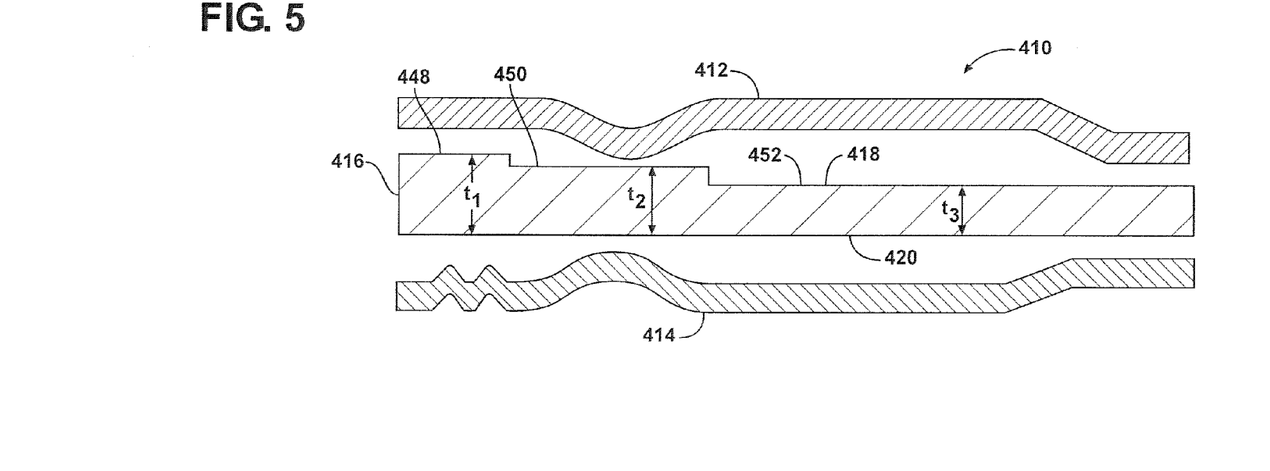
FIG. 5 is a radial cross-sectional side view of a multilayer cylinder head gasket constructed in accordance with yet another aspect of the invention.

FIG. 5 illustrates a multilayer gasket 410 constructed in accordance with another aspect of the invention, wherein the same reference numerals used above offset by 400 are used to illustrate like features. The gasket 410 has a pair of outer functional layers 412, 414 and a sandwiched intermediate distance layer 416. The functional layer 412 is generally the same as the functional layer 12 discussed above in the first embodiment, and the functional layer 414 is generally the same as the functional layer 114 discussed above in the second embodiment. Correspondingly, the distance layer 416 has an upper side 418 arranged to abut the functional layer 412 and configured the same as the side 18 of the distance layer 16, and thus, having first, second and third portions 448, 450, 452 with respective thicknesses t1, t2, t3, wherein t1 is greater than t2, and t2 is greater than t3. Further, the distance layer 416 has a lower side 420 that is flat or planar and arranged for abutment with the functional layer 414. Accordingly, the gasket 410 is a hybrid of the gaskets 10, 110, providing the upper surface as described for the gasket 10 and the lower surface 420 as described for the gasket 110.

Figure 6:
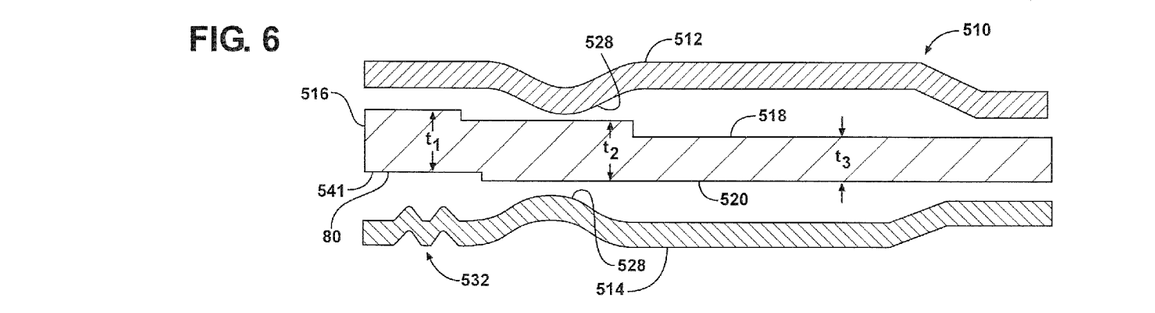
FIG. 6 is a radial cross-sectional side view of a multilayer cylinder head gasket constructed in accordance with yet another aspect of the invention.

FIG. 6 illustrates a multilayer gasket 510 constructed in accordance with another aspect of the invention, wherein the same reference numerals used above offset by 500 are used to illustrate like features. The gasket 510 is similar to the gasket 410, having outer functional layers 512, 514 configured the same as the functional layers 412, 414. Further, the gasket has a sandwiched intermediate distance layer 516 having first, second and third portions 548, 550, 552 with respective thicknesses t1, t2, t3, wherein t1 is greater than t2, and t2 is greater than t3. Further, the distance layer 516 has a side 518 configured generally the same as the side 418 for abutment with the functional layer 512. However, the distance layer 516 has an opposite side 520 with an inner periphery portion 541 having a recessed annular portion 80 configured for abutment with a sinuous compression limiter 532 on the functional layer 514. The recessed portion 80 has a depth that ensures engagement of the recessed portion 80 with the peaks of the compression limiter 532 while at the same time preventing full compression of a full bead 528 on the functional layer 514 during assembly and while in use. Accordingly, as with all the previous embodiments, the beads 528 of the functional layers 512, 514 remain less than fully compressed both during assembly and while in use, thereby maximizing the sealing pressures exerted by the beads 528 and preventing premature fatigue thereto.

Figure 7:
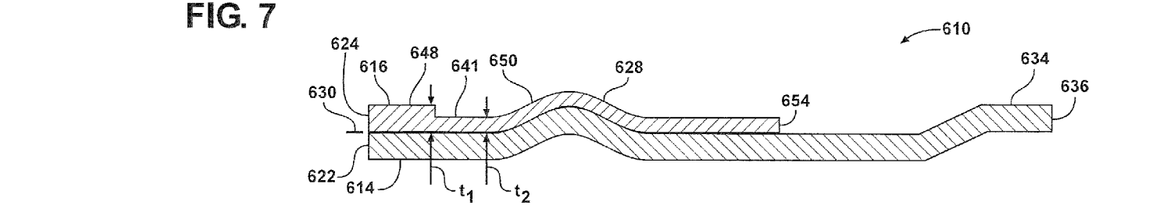
FIG. 7 is a radial cross-sectional side view of a multilayer cylinder head gasket constructed in accordance with yet another aspect of the invention.

FIG. 7 illustrates a multilayer gasket 610 constructed in accordance with another aspect of the invention, wherein the same reference numerals used above offset by 600 are used to illustrate like features. The gasket 610, unlike all those previously discussed, has a single functional layer 614. The functional layer 614 is shaped generally the same as the functional layers 14, 214. Accordingly, the functional layer 614 has a full compression seal bead 628 formed radially outwardly from an opening 622 and radially outwardly from an inner periphery portion 641 that lies along a plane 630. The functional layer also has a half bead 634 formed to extend to an outer periphery portion 636, with the beads 628, 634 facing axially outwardly from the plane 630 in the same direction.

The gasket 610 further includes a distance layer 616 configured to lie partially along the plane 630 of the functional layer 614. The distance layer 616 has a first portion 648 forming an opening 624 substantially flush with the opening 622 of the functional layer 614 with the first portion 648 having a first thickness (t1), wherein the thickness t1 is the thickest portion of the distance layer 616. The first portion 648 extends radially outwardly from the opening 624 to a step that transitions to a second portion 650 having a second thickness (t2) that is less than the thickness t1. The second portion 650 is configured to start between the opening 622 and the full bead 628 of the functional layer 614, shown here as originating about midway between the opening 622 and the full bead 628. The second portion 650 extends across the full bead 628 to an outer periphery 654 that terminates between the full bead 628 and the half bead 634 of the functional layer 614, and is shown here as terminating about midway between the full bead 628 and the half bead 634. The second portion 650 conforms in contour with the full bead 628 as it extends across the full bead 628, and thus, undulates in mating abutment with the full bead 628. Accordingly, the gasket 610 has a thickest region as viewed in axial cross-section across the first thickness t1 of the first portion 648 between the opening 622 and the full bead 628. Further, the gasket 610 has an intermediate thickness region as viewed in axial cross-section across the second thickness t2 of the second portion 650 starting about midway between the opening 622 and the full bead 628 and extending to about midway between the full bead 628 and the half bead 634. Further, the gasket 610 has a minimum thickness region as viewed in axial cross-section across the functional layer 614 starting about midway between the full bead 628 and the half bead 634 and extending to the outer periphery portion 636. As such, the minimum thickness region is provided solely by the functional layer 614.

Figure 8:
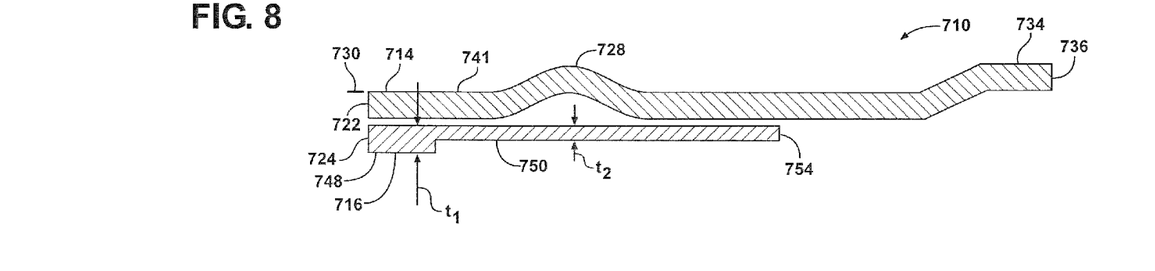
FIG. 8 is a radial cross-sectional side view of a multilayer cylinder head gasket constructed in accordance with yet another aspect of the invention.

FIG. 8 illustrates a multilayer gasket 710 constructed in accordance with another aspect of the invention, wherein the same reference numerals used above offset by 700 are used to illustrate like features. The gasket 710 has a single functional layer 714 shaped the same as the functional layer 614. Accordingly, the functional layer 714 has a full compression seal bead 728 formed radially outwardly from an opening 722 and radially outwardly from an inner periphery portion 741 that lies along a plane 730. The functional layer also has a half bead 734 formed to extend to an outer periphery portion 736, with the beads 728, 734 facing axially outwardly from the plane 730 in the same direction.

The gasket 710 further includes a distance layer 716 shaped similarly to the distance layer 616. Accordingly, the distance layer 716 has a first portion 748 with an opening 724 substantially flush with the opening 722 of the functional layer 714 with the first portion 748 having a first thickness (t1), wherein the thickness t1 is the thickest portion of the distance layer 716. The first portion 748 extends radially outwardly from the opening 724 to step that transitions to a second portion 750 having a second thickness (t2) that is less than the thickness t1. The second portion 750 is configured to start between the opening 722 and the full bead 728 of the functional layer 714, shown here as originating about midway between the opening 722 and the full bead 728. The second portion 750 extends across the full bead 728 to an outer periphery 754 that terminates between the full bead 728 and the half bead 734 of the functional layer 714, and is shown here as terminating about midway between the full bead 728 and the half bead 734. However, unlike the previous distance layer 616, the distance layer is placed against an opposite side of the functional layer 614. As such, the second portion 750 is a flat, planar construction that extends across a valley of the full bead 728, and does not conform in contour with the full bead 728. Accordingly, the second portion 750 traverses the undulation of the full bead 728 without conforming therewith. As with the previous gasket 610, the gasket 710 has a thickest region as viewed in axial cross-section across the first thickness t1 of the first portion 748 between the opening 722 and the full bead 728. Further, the gasket 710 has an intermediate thickness region as viewed in axial cross-section across the second thickness t2 of the second portion 750 starting about midway between the opening 722 and the full bead 728 and extending to about midway between the full bead 728 and the half bead 734. Further, the gasket 710 has a minimum thickness region as viewed in axial cross-section across the functional layer 714 starting about midway between the full bead 728 and the half bead 734 and extending across the half bead 734. As such, as with the functional layer 614, the minimum thickness region is provided solely by the functional layer 714.

Figure 9:
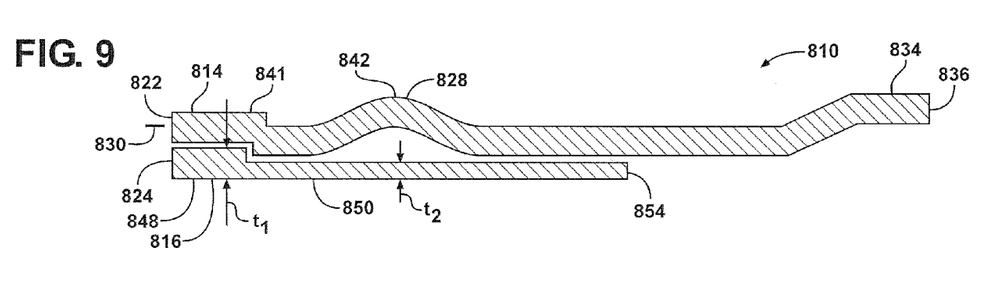
FIG. 9 is a radial cross-sectional side view of a multilayer cylinder head gasket constructed in accordance with yet another aspect of the invention.

FIG. 9 illustrates a multilayer gasket 810 constructed in accordance with yet another aspect of the invention, wherein the same reference numerals used above offset by 800 are used to illustrate like features. The gasket 810 has a single functional layer 814 shaped similar to the functional layers 614, 714, however, the functional layer has a stepped portion formed in an inner periphery portion 841. Otherwise, the functional layer 814 is the same as the functional layers 614, 714. Accordingly, the functional layer 814 has a full compression seal bead 828 formed radially outwardly from an opening 822 and radially outwardly from the inner periphery portion 841 that lies partially along a plane 830, with the stepped portion extending axially outwardly from the plane 830 in the same direction as the full bead 828, however, not to the extent of a peak 842 of the full bead 828. Accordingly, an upper surface of the stepped portion lies between the plane 830 and a plane tangent to the peak 842 of the full bead 828. The functional layer 814 also has a half bead 834 formed to extend to an outer periphery portion 836, with the beads 828, 834 facing outwardly from the plane 830 in the same direction.

The gasket 810 further includes a distance layer 816 shaped the same as the distance layer 716. Accordingly, the distance layer 816 has a first portion 848 forming an opening 824 substantially flush with the opening 822 of the functional layer 814 with the first portion 848 having a first thickness (t1), wherein the thickness t1 is the thickest portion of the distance layer 816. The first portion 848 extends radially outwardly from the opening 824 to a step that transitions to a second portion 850 having a second thickness (t2) that is less than the thickness t1. The second portion 850 is configured to start between the opening 822 and the full bead 828 of the functional layer 814, shown here as originating about midway between the opening 822 and the full bead 828. The second portion 850 extends across the full bead 828 to an outer periphery 854 that terminates between the full bead 828 and the half bead 834 of the functional layer 814, and is shown here as terminating about midway between the full bead 828 and the half bead 834. As with the distance layer 716, the distance layer 816 is arranged to abut the opposite side of the functional layer 614 from which full and half beads 828, 834 extend. The notable difference with the gasket 810 from the gasket 710 is that the stepped, first thickness t1 of the first portion 848 faces and is received in the stepped region of the functional layer 814. As with the previous gaskets 610, 710, the gasket 810 has a thickest region as viewed in axial cross-section across the first thickness t1 of the first portion 848 between the opening 822 and the full bead 828. Further, the gasket 810 has an intermediate thickness region as viewed in axial cross-section across the second thickness t2 of the second portion 850 starting about midway between the opening 822 and the full bead 828 and extending to about midway between the full bead 828 and the half bead 834. Further, the gasket 810 has a minimum thickness region as viewed in axial cross-section across the functional layer 814 starting about midway between the full bead 828 and the half bead 834 and extending across the half bead 834. As such, the minimum thickness region is provided solely by the functional layer 814.

Figure 10:
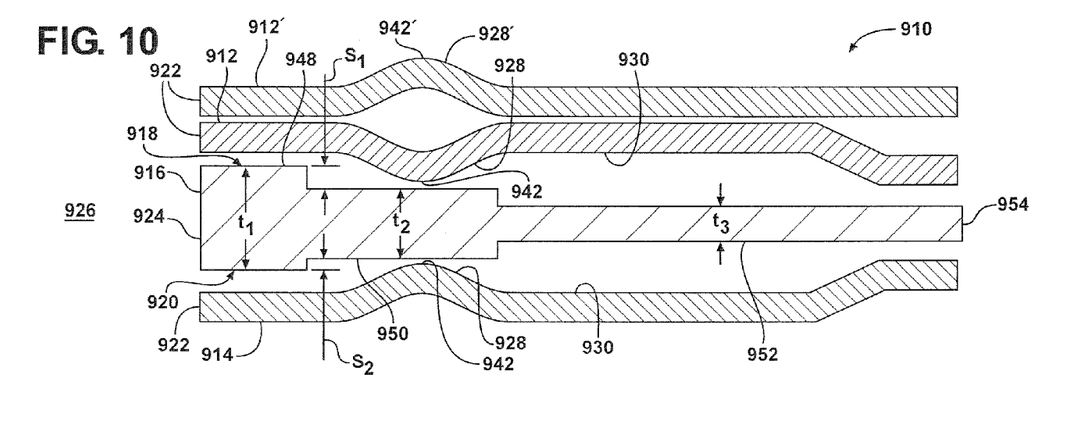
FIG. 10 is a radial cross-sectional side view of a multilayer cylinder head gasket constructed in accordance with yet another aspect of the invention.

FIG. 10 illustrates a multilayer gasket 910 constructed in accordance with yet another aspect of the invention, wherein the same reference numerals used above offset by 900 are used to illustrate like features. The gasket 910 has three functional layers 912, 912' and 914, and a distance layer 916. The functional layers 912, 914 are configured and arranged essentially the same as discussed above with respect to the functional layers 12, 14. Accordingly, the functional layers 912, 914 are arranged to abut opposite sides 918, 920 of the distance layer 916, such that the distance layer 916 is sandwiched between the functional layers 12, 14. Meanwhile, the functional layer 912' overlies and abuts the functional layer 912. The functional layers 912, 912', 914 each have an opening 922 sized to register with an opening 924 in the distance layer 916, wherein the respective openings are each arranged with one another to register with a cylinder bore 926. The functional layers 912, 914 each have full compression seal beads 928 extending outwardly from a plane 30 of the layers 12, 14 to facilitate establishing a gas-tight seal about the cylinder bore 926. The functional layer 912' also has a full compression bead 928' sized generally the same as the other functional beads 928 and configured to align opposite the functional bead 928 of the functional layer 912.

The distance layer 916, rather than being constructed having a symmetrical geometry as viewed in radial cross-section, is constructed having an asymmetrical geometry as viewed in radial cross-section. As with the embodiment of FIG. 1, each side 918, 920 extends radially outwardly from the opening 924 along a first portion 948 having a first thickness (t1), wherein the thickness t1 is the thickest portion of the distance layer 916. The first portion 948 extends radially outwardly to a second portion 950 having a second thickness (t2) that is less than the thickness t1, and the second portion 950 extends radially outwardly a predetermined distance to a third portion 952 having a third thickness (t3) that is less than t2. The third portion 952 extends to an opening 54 that facilitates sealing a fluid passage, such as the oil port or a coolant chamber 38, for example. The thicknesses t1 and t2 of the respective first and second portions 948, 950 are offset relative to one another as viewed in radial cross-section. As such, a step height difference is provided on opposite sides of the distance layer 916. For example, a first step height (S1) is provided on one side and a step height (S2) is provided on the opposite side, wherein S1 is greater than S2. In one preferred embodiment, S1 is twice the height of S2, wherein the bead heights 928, 928' are generally the same. It should be recognized that the relative heights of the steps S1 and S2 can be otherwise configured and that the relative heights of the beads 928, 928' can be otherwise configured.

Upon assembly, the abutting functional layers 928, 928' are arranged such that their respective full bead 928, 928' are aligned in mirrored relation with one another, with their respective peaks 948, 948' facing away from one another. With the gasket 910 having two abutting functional layers 912, 912' with oppositely facing full beads arranged to abut the second portion 950, and a third functional layer 914 having a full bead arranged to abut an opposite side of the second portion 950, a greater dynamic gap formed between the cylinder head and the engine block in use can be sealed against gas leaks from the cylinder bore 926.

Obviously, many modifications and variations of the present invention are possible in light of the above teachings.

It is, therefore, to be understood that within the scope of the appended claims, the invention may be practiced otherwise than as specifically described.

What is claimed is:

1. A multilayer cylinder head gasket for establishing a seal between a cylinder head and an engine block, comprising:
   a first functional layer forming a first opening and including a first full compression bead radially outwardly from and circumferentially surrounding said first opening, said first full compression bead extending out of a plane of said first functional layer;
   a second functional layer forming a second opening aligned with said first opening and including a second full compression bead radially outwardly from and circumferentially surrounding said second opening, said second full compression bead extending out of a plane of said second functional layer;
   a distance layer provided by a plurality of pieces of material disposed between said first functional layer and said second functional layer, said distance layer presenting a first portion extending radially from an opening aligned with said openings of said functional layers, said distance layer presenting a second portion extending radially outwardly from said first portion and aligned with said full compression beads of said functional layers, and said distance layer presenting a third portion extending radially outwardly from said second portion, and
   said first portion of said distance layer presenting a first thickness, said second portion of said distance layer presenting a second thickness, and said third portion of said distance layer presenting a third thickness, wherein said first thickness is greater than said second thickness and said second thickness is greater than said third thickness.

2. The cylinder head gasket of claim 1 wherein said first functional layer includes a first half bead extending axially outwardly from said plane of said first functional layer, said second functional layer includes a second half bead extending axially outwardly from said plane of said second functional layer, and said half beads are aligned with said third portion of said distance layer.

3. The cylinder head gasket of claim 2 wherein said first portion of said distance layer terminates between said openings and said full compression beads and said second portion of said distance layer terminates between said full compression beads and said half compression beads.

4. The cylinder head gasket of claim 2 wherein said full compression beads extend axially outwardly a predetermined first distance, and said half beads extend axially outwardly a predetermined second distance and in the same direction as said first distance, and said first distance is greater than said second distance.

5. The cylinder head gasket of claim 2 wherein each of said full compression beads presents a peak, said peaks face toward one another, and each of said half beads presents a plateau parallel to said planes of said functional layer.

6. The cylinder head gasket of claim 1 wherein said distance layer is asymmetrical.

7. The cylinder head gasket of claim 1 wherein at least one of said pieces of said distance layer limits compression of at least one of said full compression beads when said functional layers are compressed together.

8. The cylinder head gasket of claim 1 wherein said first portion of said distance layer presents a surface abutting one of said functional layers.

9. The cylinder head gasket of claim 1 wherein said first and second portions of said distance layer present a surface abutting one of said functional layers.

10. The cylinder head gasket of claim 9 wherein said full compression bead of said one functional layer presents a contour and said second portion of said distance layer conforms to said contour of said full compression bead.

11. The cylinder head gasket of claim 1 wherein said distance layer includes a step.

12. The cylinder head gasket of claim 1 wherein said first functional layer consists of a single piece of material extending along said first portion and said second portion and said third portion of said distance layer; and said second functional layer consists of a single piece of material extending along said first portion and said second portion and said third portion of said distance layer.

13. The cylinder head gasket of claim 1 wherein each of said full compression beads present a peak and said peaks extend inwardly toward one another.

14. The cylinder head gasket of claim 1 wherein said first functional layer mirrors said second functional layer.

* * * * *